United States Patent
Koltenuk

(10) Patent No.: US 8,300,781 B1
(45) Date of Patent: *Oct. 30, 2012

(54) METHOD AND APPARATUS FOR RETRIEVING ALL VOICEMAIL MESSAGES AT THE SAME TIME

(75) Inventor: Joyce Koltenuk, Flanders, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1120 days.

This patent is subject to a terminal disclaimer.

(21) Appl. No.: 11/413,297

(22) Filed: Apr. 28, 2006

(51) Int. Cl.
H04M 1/64 (2006.01)

(52) U.S. Cl. .................... 379/88.23; 379/88.11

(58) Field of Classification Search ..... 379/88.11–88.26
See application file for complete search history.

(56) References Cited

U.S. PATENT DOCUMENTS

| | | | |
|---|---|---|---|
| 4,640,991 A * | 2/1987 | Matthews et al. | 379/88.26 |
| 4,757,525 A * | 7/1988 | Matthews et al. | 379/88.26 |
| 5,172,404 A | 12/1992 | Hashimoto | |
| 5,568,540 A * | 10/1996 | Greco et al. | 379/88.25 |
| 5,822,405 A | 10/1998 | Astarabadi | |
| 5,943,402 A * | 8/1999 | Hamel et al. | 379/88.26 |
| 5,991,369 A * | 11/1999 | Petrunka et al. | 379/88.25 |
| 6,052,442 A * | 4/2000 | Cooper et al. | 379/88.19 |
| 6,219,638 B1 * | 4/2001 | Padmanabhan et al. | 704/235 |
| 6,341,160 B2 * | 1/2002 | Tverskoy et al. | 379/88.13 |
| 6,385,306 B1 * | 5/2002 | Baxter, Jr. | 379/88.13 |
| 6,526,128 B1 * | 2/2003 | Kermani | 379/88.22 |
| 7,043,433 B2 * | 5/2006 | Hejna, Jr. | 704/270 |
| 7,379,421 B1 * | 5/2008 | Gao et al. | 370/230.1 |
| 7,535,890 B2 * | 5/2009 | Rojas | 370/352 |
| 2003/0023689 A1 * | 1/2003 | Brown et al. | 709/206 |
| 2003/0152207 A1 * | 8/2003 | Ryan | 379/201.04 |
| 2004/0252679 A1 * | 12/2004 | Williams et al. | 370/356 |
| 2006/0029050 A1 * | 2/2006 | Harris et al. | 370/356 |
| 2006/0031340 A1 * | 2/2006 | Mathew et al. | 709/206 |

* cited by examiner

Primary Examiner — Davetta Goins
Assistant Examiner — Mohammad Islam

(57) ABSTRACT

A method and apparatus for retrieving all voicemail messages at the same time on packet networks such as Voice over Internet Protocol (VoIP) and Service over Internet Protocol (SoIP) networks are disclosed. For example, the customer subscribes to a voicemail service where a plurality of voicemails can be retrieved and listened to at the same time. Specifically, when the customer accesses the voicemail service, the application server engages the media server to play the audio files from each of the voicemail messages at the same time, i.e., in a continuous or consecutive manner via a single input. Namely, the audio files are played consecutively without requiring another input from the customer, unless the customer wishes to execute a voicemail function.

8 Claims, 4 Drawing Sheets

METHOD AND APPARATUS FOR RETRIEVING ALL VOICEMAIL MESSAGES AT THE SAME TIME

The present invention relates generally to communication networks and, more particularly, to a method for retrieving all voicemail messages at the same time in packet networks such as Voice over Internet Protocol (VoIP) and Service over Internet Protocol (SoIP) networks.

BACKGROUND OF THE INVENTION

The Internet has emerged as a critical communication infrastructure, carrying traffic for a wide range of important applications. Internet services such as VoIP and SoIP services are becoming ubiquitous and more and more businesses and consumers are utilizing these networks to obtain services from any location with an Internet connection. For example, customers may combine their data and voice services on an Internet based infrastructure such as VoIP and reduce the cost associated with multiple communications infrastructures. When customers subscribe to a voicemail service on a VoIP or SoIP platform, the network service provider creates and sends email messages containing audio files to the customer. If a customer receives multiple voicemail messages, the customer listens to each audio clip one by one. For example, a customer clicks on an email, clicks and listens to the audio file until it is finished, clicks on another email, and so on. However, the customers are used to being able to multitask while listening to voicemail messages stored on answering machines. i.e., the customer may wish to perform other tasks while listening to voicemail messages.

Therefore there is a need for a method and apparatus that enables the VoIP or SoIP service provider to enable a customer to retrieve and listen to all voicemail messages at the same time.

SUMMARY OF THE INVENTION

In one embodiment, the present invention discloses a method and apparatus for retrieving all voicemail messages at the same time on packet networks such as Voice over Internet Protocol (VoIP) and Service over Internet Protocol (SoIP) networks. The method enables a customer to subscribe to a voicemail service that enables the customer to retrieve and listen to a plurality of voicemail messages at the same time (e.g., with one request or click). For example, the network service provider provides a method to the customer for accessing messages stored in the network such as a web based access with a pop-up window for performing functions on each of the messages. When the customer accesses the voicemail service, the application server engages the media server to play the audio files from each of the voicemail messages that has been received in a continuous or consecutive manner in a format compatible with the customer's receiving device. In other words, the audio files are played consecutively without requiring another input from the customer unless the customer wishes to perform functions on the individual messages, e.g., skip message, replay message, delete message, etc.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for retrieving all voicemail messages at the same time on networks such as VoIP or SoIP networks. Although the present invention is discussed below in the context of calls in VoIP and SoIP networks, the present invention is not so limited. Namely, the present invention can be applied to other networks such as a cellular network.

Figure 1:
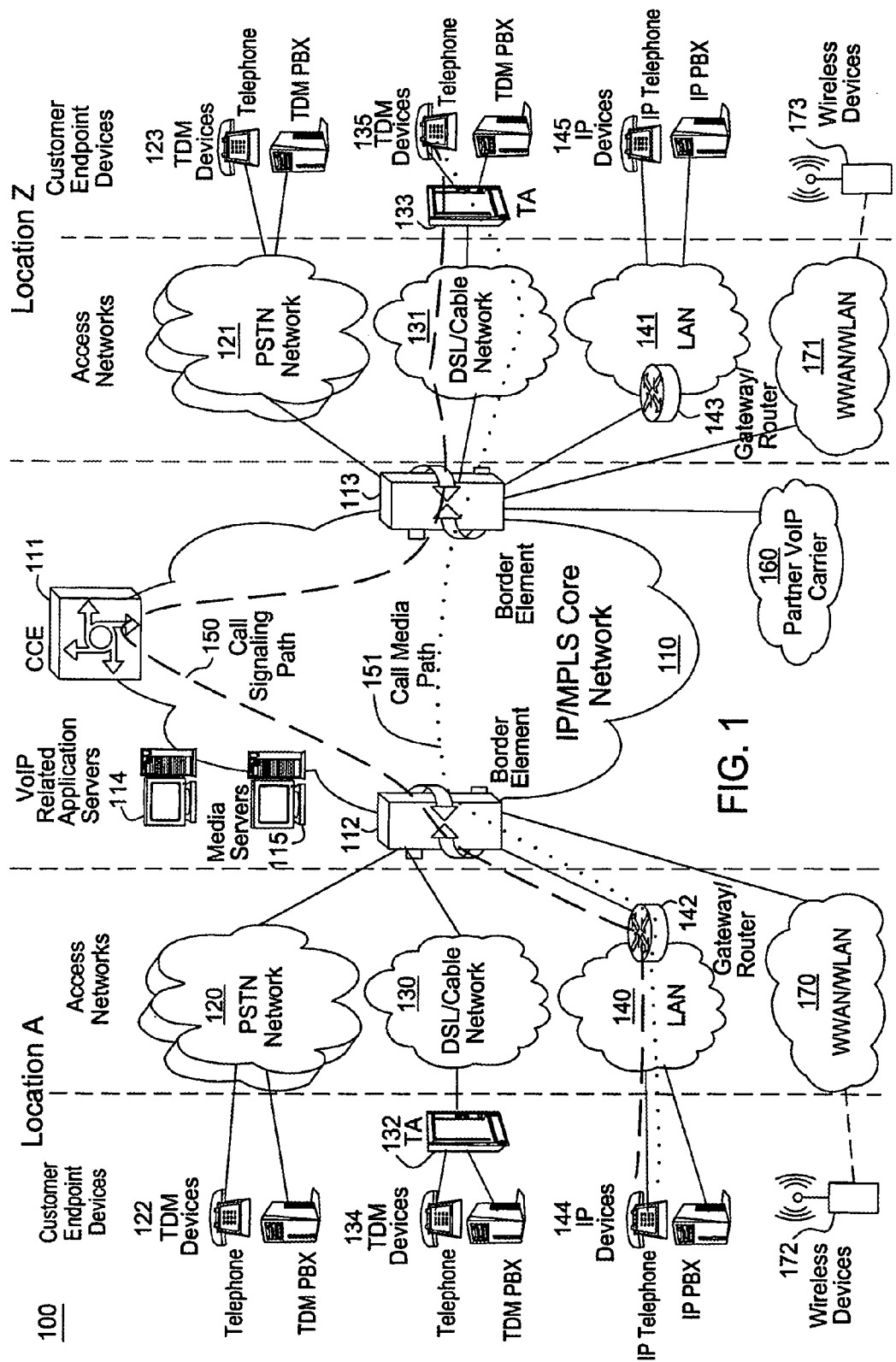
FIG. 1 illustrates an exemplary network related to the present invention.

To better understand the present invention, FIG. 1 illustrates an example network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based, IP based or wireless such as cellular phones. TDM based customer endpoint devices 122, 123, 134, and 135 typically comprise of TDM phones or Private Branch Exchange (PBX). IP based customer endpoint devices 144 and 145 typically comprise IP phones or IP PBX. Wireless endpoint devices 172 and 173, typically comprise cellular phones, pocket PCs etc. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 which has a VoIP gateway router 142 or 143, as shown in FIG. 1. Wireless endpoint devices access VoIP services by using Wireless Local Area Networks (WLAN) or Wireless Wide Area Networks (WWAN) 170 and 171. The WLAN/WWAN networks 170 and 171 are connected to the IP core network 110 through the border elements 112 and 113, respectively.

The access networks for wired devices can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices. The access network for wireless devices 170 and 171 can be WLAN, WWAN or an integrated WLAN/WWAN network.

The core VoIP infrastructure comprises of several key VoIP components, such as the Border Elements (BEs) 112 and 113, the Call Control Element (CCE) 111, VoIP related Application Servers (AS)114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which services are provided on networks such as VoIP and SoIP networks. For example, customers may combine their data and voice services on a network such as VoIP or SoIP. When customers subscribe to a voicemail service on a VoIP or SoIP platform, the network service provider creates and sends email messages containing audio files to the customer. If a customer receives multiple messages, the customer typically opens each email and listens to each audio clip one at a time. For example, a customer clicks on an email, clicks and listens to the audio file contained in the email, opens another email, listens to the audio file contained in that email, and so on. However, the customers are used to being able to multitask while listening to voicemail messages. Thus, a customer who wishes to be able to perform other tasks while listening to voicemail messages is unable to do so with regard to voicemail services that are currently provided on a VoIP or SoIP network.

Figure 2:
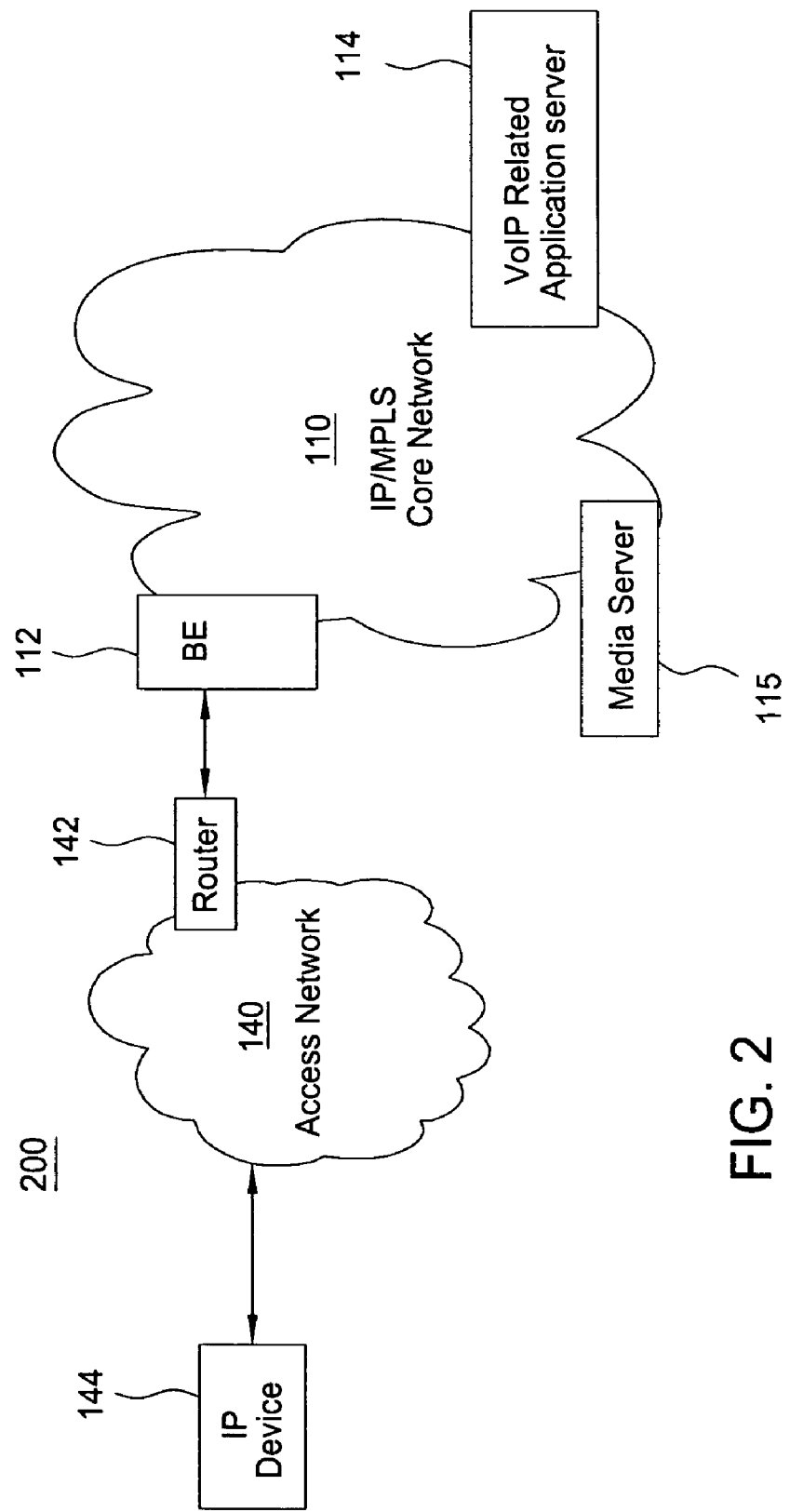
FIG. 2 illustrates an exemplary network with one embodiment of the invention for retrieving all voicemail messages.

FIG. 2 illustrates an exemplary network 200 with one embodiment of the present invention for retrieving all voicemail messages at the same time, e.g., in a continuous or consecutive manner. Typically, a customer may access VoIP or SoIP services using an endpoint device connected to a network. For example, the customer may use an IP device 144 to interact with a voicemail server 114. Although only one IP device 144 is shown, those skilled in the art will realize that the user may employ a plurality of endpoint devices that are all capable of accessing the voicemail messages. For example, the various endpoint devices can be interconnected to share resources such as printers, Internet connection, etc. The interconnection can utilize a variety of technologies such as wireless communication, Ethernet based communication, telephone lines etc. If the Internet connection is shared among several endpoint devices such as computers, a router (not shown) can be used to handle the connection sharing.

In one embodiment, the router is a networking device used to forward packets towards their destination using the Layer-3 networking protocol such as IP. In the home or small office environment, it is used to handle the sharing of the Internet connection. Thus, the router has address translation capability to allow multiple computers to access the Internet using a single public IP address. The router in this environment may contain a firewall, an Ethernet hub and wireless hub functions. When analog phones are used to access VoIP services, the router may also include RJ-11 ports for connecting with the TA. Hence, the router has a variety of ports such as Ethernet ports, RJ-11 ports, wireless ports and the like, to enable sharing of the network connection and a port for connecting to either a DSL or Cable broadband network.

In one embodiment, the modems (not shown) and connections are selected based on the type of broadband access and the customer's network. In order to originate a call using an analog device, the analog device is attached to a terminal adaptor that is in turn connected to either a router or directly to a broadband modem.

A customer combining data and voice services on a VoIP or SoIP network may utilize an endpoint device 144 such as a computer to access VoIP or SoIP services. An audio device such as a speaker attached to the computer may be used for listening.

In turn, the IP device 144 is connected to a local access network 140, e.g., a local telephone service provider's network, a cable service provider's network and the like. The local access network 140 is connected to an IP/MPLS core network 110 via a router 142 and a border element 112.

In one embodiment, the VoIP or SoIP service provider may utilize the application server 114 to enable the customer to access services and retrieve voicemail messages. The application server 114 may also utilize a media server 115 to interact with the customer in a format compatible with the user's endpoint device. For example, if a user has an endpoint device that can handle packets below a specific size, the application server 114 may utilize the media server 115 to create multiple smaller packets, use data compression techniques to reduce the size of the messages, and so on. In another embodiment, the service provider may also enable the customer to provide preferences for accessing voicemails and utilize the media server to format the messages in accordance with the selected or defined preferences. For example, a customer may wish to delete voicemail messages that have been played, delete voicemail messages based on aging, save messages for future reference, etc.

In one embodiment, the service provider may provide a pop-up window for message review functions such as playback, fast-forward, delete, etc. Although the present invention is described using a VoIP or SoIP application server for all voicemail service functions including storing received messages in a database, interacting with the customer via a media server, providing a pop-window for message review, those skilled in the art would realize multiple application servers can also be used. Furthermore only the network elements needed to describe the invention are illustrated in FIG. 2. It is not intended to show all the network components or connectivity needed to provide the VoIP or SoIP services.

Figure 3:
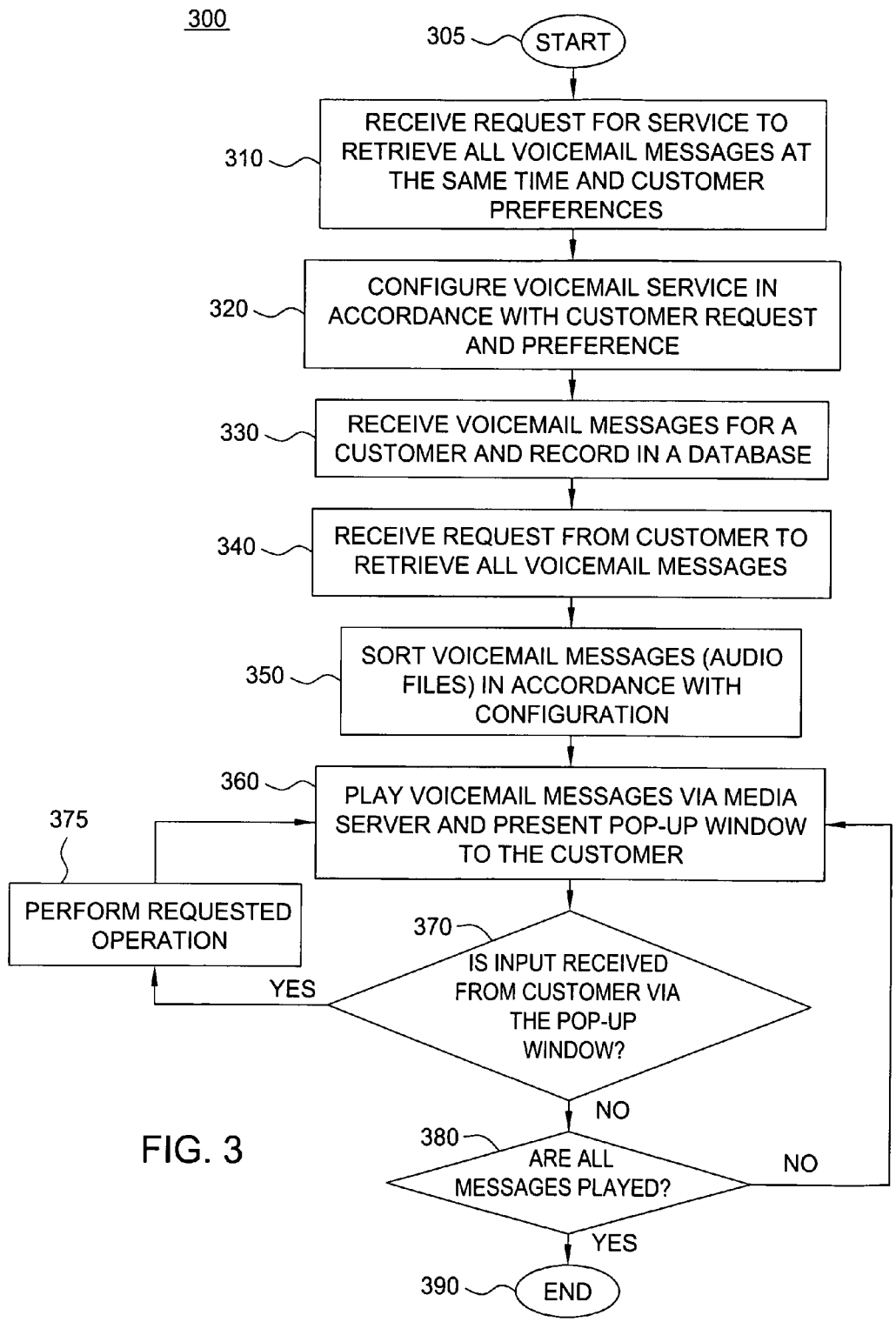
FIG. 3 illustrates a flowchart of the method for retrieving all voicemail messages.

FIG. 3 illustrates a flowchart of the method 300 for retrieving all voicemail messages at the same time. In one embodiment, the service provider provides voicemail services on an application server and enables the customer to access the services at the same time, e.g., playing a plurality of stored voicemails in a continuous or consecutive manner. For example, the service provider may provide a web based password protected access to the application server used for the voicemail service. The service provider then enables the voicemail messages to be stored in a database and enables the media server to play the messages at the same time in a format compatible with the customer's device.

In one embodiment, the service provider also enables the application server to present a pop-up window to the customer via the media server. The pop-up window enables the customer to perform functions such as playback, delete messages, forward messages, store messages as old or new, and the like.

Method 300 starts in step 305 and proceeds to step 310. In step 310, method 300 receives a request for a service to retrieve all voicemail messages at the same time, and/or customer preferences. For example, a customer may request a voicemail service that plays all new voicemail messages with only a single input from the customer and/or requests all messages that have been played to be deleted with only a single input.

In step 320, method 300 configures the voicemail service according to the customer preferences. For example, the method enables the voicemail messages to be stored in the service provider's network and enables all the audio files to be played by the media server at the same time, i.e., in a continuous or consecutive manner without requiring the user to actively click or access each voicemail individually. In one embodiment, the service provider receives customer preferences for handling voicemail messages and provides services according to the preferences. For example, if a customer wishes to delete all messages that have been played, the voicemail messages are played one time and deleted. The customer sets the preferences for message disposition when he/she subscribes for the voicemail service.

For example, the preferences may be selected to provide various orders of playback, e.g., voicemails from the customer's office or clients are grouped together and played first, or voicemails from previously defined family members are grouped together and played first, or voicemails with phone numbers that have previously been dialed by the customer's endpoint device are grouped together and played first, and so on. In one embodiment, the service provider may also provide a default configuration. The default configuration may include playing the audio files in the order received, sorted by caller name, sorted by caller's phone number, etc.

In step 330, method 300 receives one or more voicemail messages for a customer and records the messages in a database. For example, a caller may leave a voicemail for a customer. This allows the customer to play the audio files along with other voicemail messages at a later time.

In step 340, method 300 receives a request for retrieving all voicemail from the customer. For example, the customer accesses the application server, provides the password if applicable and requests for the messages to be played.

In step 350, method 300 optionally sorts the voicemail messages (audio files) according to the configurations in step 320 and proceeds to step 360 to play the messages. For example, if there is no specific request from the customer, the audio files may be played in the order received similar to an answering machine. However, if the customer specifies a particular playback order, e.g., via the provided pop-up window, then the requested operations are performed in accordance with the customer request.

In step 360, method 300 plays all voicemail messages via a media server and presents a pop-up window to the customer in a format compatible with the customer's endpoint device. The messages are presented until either all messages are played or the customer provides a separate request. For example, if a customer provides no further input, the audio files are played consecutively without requiring inputs from the user, e.g., only separated by an audible tone between messages. However, if a customer wishes to take a particular action for a particular voicemail message, e.g., to playback a message again, then the customer may send the request via the pop-up window. The service provider determines the various functions that may be performed via the pop-up window. For example, a service provider may enable the customer to specify playing the audio files in the order received, in reverse order, and so on.

In step 370, method 300 optionally determines whether or not an input is received from the customer via the pop-up window. If an input is received, the method proceeds to step 375, to perform the requested operation. Again, this step allows the user to interrupt the continuous playback of voicemail messages to perform a particular operation, e.g., delete a message, store a message as new, forward a message and so on. Otherwise, the method proceeds to step 380 to determine whether or not all messages are played.

In step 375, method 300 performs the operations requested via the pop-up window. Examples of operations (broadly defined as voicemail functions) that may be requested are skip message, repeat message, save as new message, save as old message, forward message, etc. The method then proceeds to step 360 to continue playing the messages.

In step 380, method 300 determines whether or not all voicemail messages are played. If all voicemail messages are played, the method proceeds to step 390 to end processing the current request. Otherwise, the method proceeds to step 360 to continue playing the stored voicemail messages. Method 300 ends in step 390.

Figure 4:
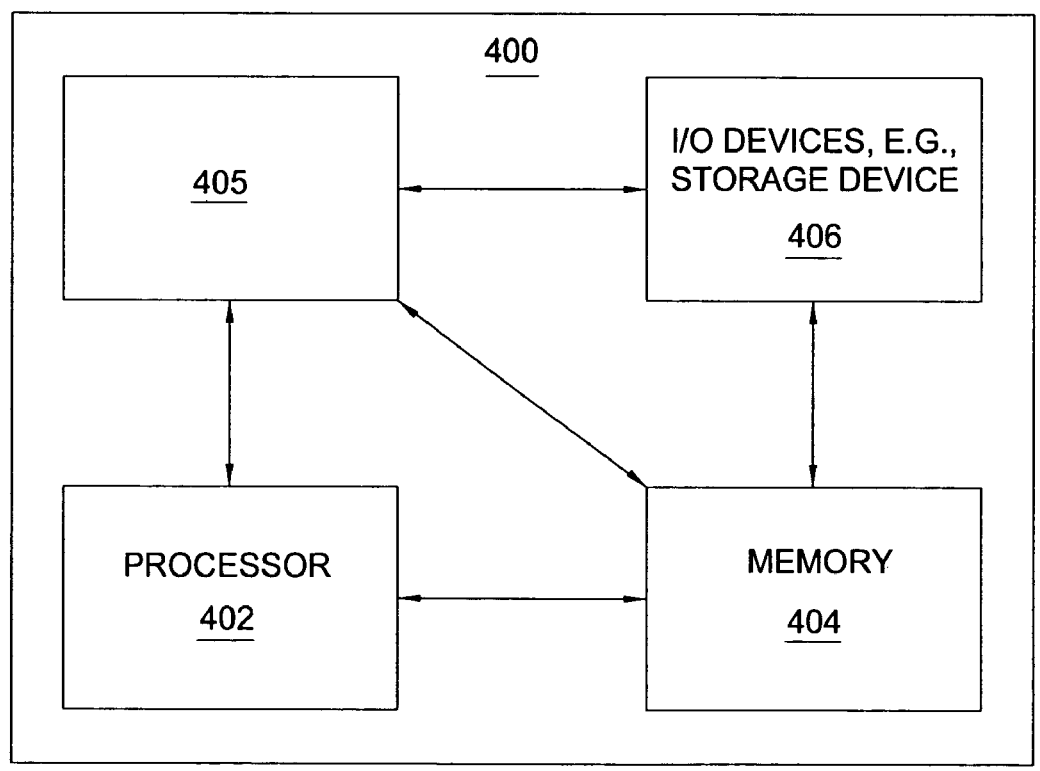
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for retrieving all voicemail messages at the same time and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 405 for retrieving all voicemail messages at the same time can be loaded into memory 404 and executed by processor 402 to implement the functions as discussed above. As such, the present method 405 for retrieving all voicemail messages at the same time (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for retrieving a plurality of voicemail messages in a communication network, comprising: formatting the plurality of voicemail messages into a format compatible with an endpoint device of a user in response to receiving a request to playback the plurality of voicemail messages, wherein the request comprises a single user input; and playing back the plurality of voicemail messages in a continuous manner without interruption from a media server in the communication network, wherein the continuous playing back of the plurality of voicemail messages is responsive to the single user input, wherein the continuous playing back of the plurality of voicemail messages being responsive to the single user input is configured in accordance with a user preference and in accordance with a predefined playback order; presenting a pop-up window during the continuous playing back of the plurality of voicemail messages; receiving an input from a user via the pop-up window during the continuous playing back of the plurality of voicemail messages; executing a voicemail function in accordance with the input that is received from the user during the continuous playing back of the plurality of voicemail messages.

2. The method of claim 1, wherein the communication network is an internet protocol network.

3. The method of claim 1, wherein the voicemail function comprises forwarding one of the plurality of voicemail messages.

4. A non-transitory computer-readable medium having stored thereon a plurality of instructions, the plurality of instructions including instructions which, when executed by a processor, cause the processor to perform a method for retrieving a plurality of voicemail messages in a communication network, comprising: formatting the plurality of voicemail messages into a format compatible with an endpoint device of a user in response to receiving a request to playback the plurality of voicemail messages, wherein the request comprises a single user input; and playing back the plurality of voicemail messages in a continuous manner without interruption from a media server in the communication network, wherein the continuous playing back of the plurality of voicemail messages is responsive to the single user input, wherein the continuous playing back of the plurality of voicemail messages being responsive to the single user input is configured in accordance with a user preference and in accordance with a predefined playback order; presenting a pop-up window during the continuous playing back of the plurality of voicemail messages; receiving an input from a user via the pop-up window during the continuous playing back of the plurality of voicemail messages; executing a voicemail function in accordance with the input that is received from the user during the continuous playing back of the plurality of voicemail messages.

5. The non-transitory computer-readable medium of claim 4, wherein the communication network is an internet protocol network.

6. The non-transitory computer-readable medium of claim 4, wherein the voicemail function comprises forwarding one of the plurality of voicemail messages.

7. An apparatus for retrieving a plurality of voicemail messages in a communication network, comprising: a processor; and a non-transitory computer-readable medium in communication with the processor, the computer-readable medium has stored thereon a plurality of instructions, plurality of instructions including instructions which, when executed by a processor, cause the processor to perform a method, comprising: formatting the plurality of voicemail messages into a format compatible with an endpoint device of a user in response to receiving a request to playback the plurality of voicemail messages, wherein the request comprises a single user input; and playing back the plurality of voicemail messages in a continuous manner without interruption from a media server in the communication network, wherein the continuous playing back of the plurality of voicemail messages is responsive to the single user input, wherein the continuous playing back of the plurality of voicemail messages being responsive to the single user input is configured in accordance with a user preference and in accordance with a predefined playback order; presenting a pop-up window during the continuous playing back of the plurality of voicemail messages; receiving an input from a user via the pop-up window during the continuous playing back of the plurality of voicemail messages; executing a voicemail function in accordance with the input that is received from the user during the continuous playing back of the plurality of voicemail messages.

8. The apparatus of claim 7, wherein the communication network is an Internet protocol network.

* * * * *